United States Patent
Sherwood et al.

[11] Patent Number: 6,151,391
[45] Date of Patent: Nov. 21, 2000

[54] PHONE WITH ADJUSTABLE SIDETONE

[76] Inventors: Charles Gregory Sherwood, 10975 Gardner Rd., Olathe, Kans. 66061; Charles Arnold Lasswell, 15619 W. 139th Ter., Olathe, Kans. 66062

[21] Appl. No.: 08/961,452

[22] Filed: Oct. 30, 1997

[51] Int. Cl.⁷ .................................................. H04M 1/00
[52] U.S. Cl. .......................... 379/391; 379/388; 379/387
[58] Field of Search ................................... 379/391, 392, 379/394, 388, 402, 390, 387

[56] References Cited

U.S. PATENT DOCUMENTS

| | | | |
|---|---|---|---|
| 3,892,924 | 7/1975 | Vachon | 179/15 |
| 4,447,675 | 5/1984 | Arntsen et al. | 455/401 |
| 4,582,957 | 4/1986 | Hayes et al. | 379/74 |
| 4,608,462 | 8/1986 | Blomley et al. | 379/390 |
| 5,029,203 | 7/1991 | Ikefuji et al. | 379/391 |
| 5,133,007 | 7/1992 | Nishimura | 379/405 |
| 5,170,430 | 12/1992 | Schuh | 379/389 |
| 5,533,119 | 7/1996 | Adair et al. | 379/391 |
| 5,555,300 | 9/1996 | Gutzmer | 379/395 |
| 5,768,364 | 6/1998 | Karnowski et al. | 379/388 |
| 5,867,573 | 2/1999 | Wittman | 379/387 |
| 5,946,391 | 8/1999 | Dragwidge et al. | 379/391 |

*Primary Examiner*—Forester W. Isen
*Assistant Examiner*—Brian Tyrone Pendleton
*Attorney, Agent, or Firm*—Ron Fish; Falk & Fish

[57] ABSTRACT

A telephone with a selectable level of sidetone for use in noisy environments. The selectable level of sidetone is achieved by forming a switch-controlled feedback path including a gain setting resistor from the output of a transmit amplifier in a hybrid circuit to a summing node virtual ground at one input of a differential amplifier driving the handset speaker. The summing node is also coupled to the audio output port of the three port hybrid so as to also receive incoming audio signals from the tip and ring lines. A microcontroller having configuration data controls whether the switch is closed and the feedback path exists or the switch is open and no feedback occurs. Lower sidetone or no sidetone is useful in phones used in noisy environments such as factory floors or restaurants.

12 Claims, 1 Drawing Sheet

PHONE WITH ADJUSTABLE SIDETONE

FIELD OF USE

The invention relates to the field of telephones, and more particularly to telephones with adjustable sidetone for use in noisy environments.

Modern telephones have sidetone which essentially is feedback of a small amount of the audio signal picked up by the telephone microphone to the telephone earpiece. This sidetone helps a user hear how loudly he is talking. However, since the sidetone is mixed in with the audio signal from the other participant in the conversation, if the phone is used in a noisy environment, the sidetone can add a significant amount noise to the audio signal being received from the other party and obscure or obliterate what the other party is saying.

In the prior art, attempts to solve this problem have included setting up quiet booths in which telephones were set up on a factory floor or in a noisy store such as a pizza delivery operation. Other alternatives are to use headphones which have sound deadening foam earpiece cushions or noise cancelling headsets to try to cut down on the amount of noise which reaches the user's ear. These alternatives are expensive and may or may not work to prevent sufficient external noise reaching the user's ear through the sidetone or through a path through the air to obscure the audio signals coming in from the other conversant. In a noisy environment where the sidetone level cannot be controlled, if external noise is picked up, it will be fed back to the earpiece of the phone in the noise environment and cause problems unless somehow the amount of this noise is cut down.

Other prior art in the area of sidetones and adjustment thereof include:
(1) U.S. Pat. No. 5,533,119 to Adair et al. filed May 31, 1994 teaching optimization of a sidetone level by generating an artificial burst of noise and feeding it into a hybrid and filtering the resulting sidetone and converting it to a DC level and comparing the DC level to a threshold. The impedance of a variable impedance circuit coupled so as to alter the amount of sidetone developed is then varied until the DC level meets the predetermined threshold.
(2) U.S. Pat. No. 5,133,007 to Nishimura filed Jun. 26, 1990 teaching a hybrid circuit with a variable impedance therein and a plurality of impedance matching circuits and a switch for selectively coupling one of the plurality of impedance matching circuits for adjusting the sidetone generating circuit in the hybrid of a FAX machine.
(3) U.S. Pat. No. 3,892,924 to Vachon, filed Aug. 12, 1974 teaches a hybrid for generating a sidetone in a sidetone-less [sic] telephone used in TDM system.
(4) U.S. Pat. No. 5,029,203 to Ikefuji et al., filed Nov. 27, 1989 teaches a circuit for preventing any sidetone at all from being generated in a telephone by adjusting the balance of an impedance bridge in a bridge circuit separating the transmitted and received circuits using an impedance measuring circuit and adjusting the impedance so as to prevent any sidetone from being generated.
(5) U.S. Pat. No. 5,555,300 to Gutzmer, filed Mar. 7, 1994 teaches a system for adjusting the level of a telephone input signal by providing a test signal to the handset and receiving the resulting sidetone and measuring the amount of distortion in the sidetone. An amplification factor is then adjusted until the amount of distortion is acceptable.

SUMMARY OF THE INVENTION

A telephone according to the genus of the invention utilizes a switch which switches a resistor into a resistor network which sets the gain of an operational amplifier which drives the earpiece of the telephone. The operational amplifier has a summing junction at which the sidetone and the received audio from the other conversant are summed prior to amplification. A programmable gain multiplexer connects one of a plurality of resistors to the summing junction and a feedback resistor from the amplifier output couples some of the output back to the summing junction.

DETAILED DESCRIPTION OF THE PREFERRED AND ALTERNATIVE EMBODIMENTS

Figure 1:
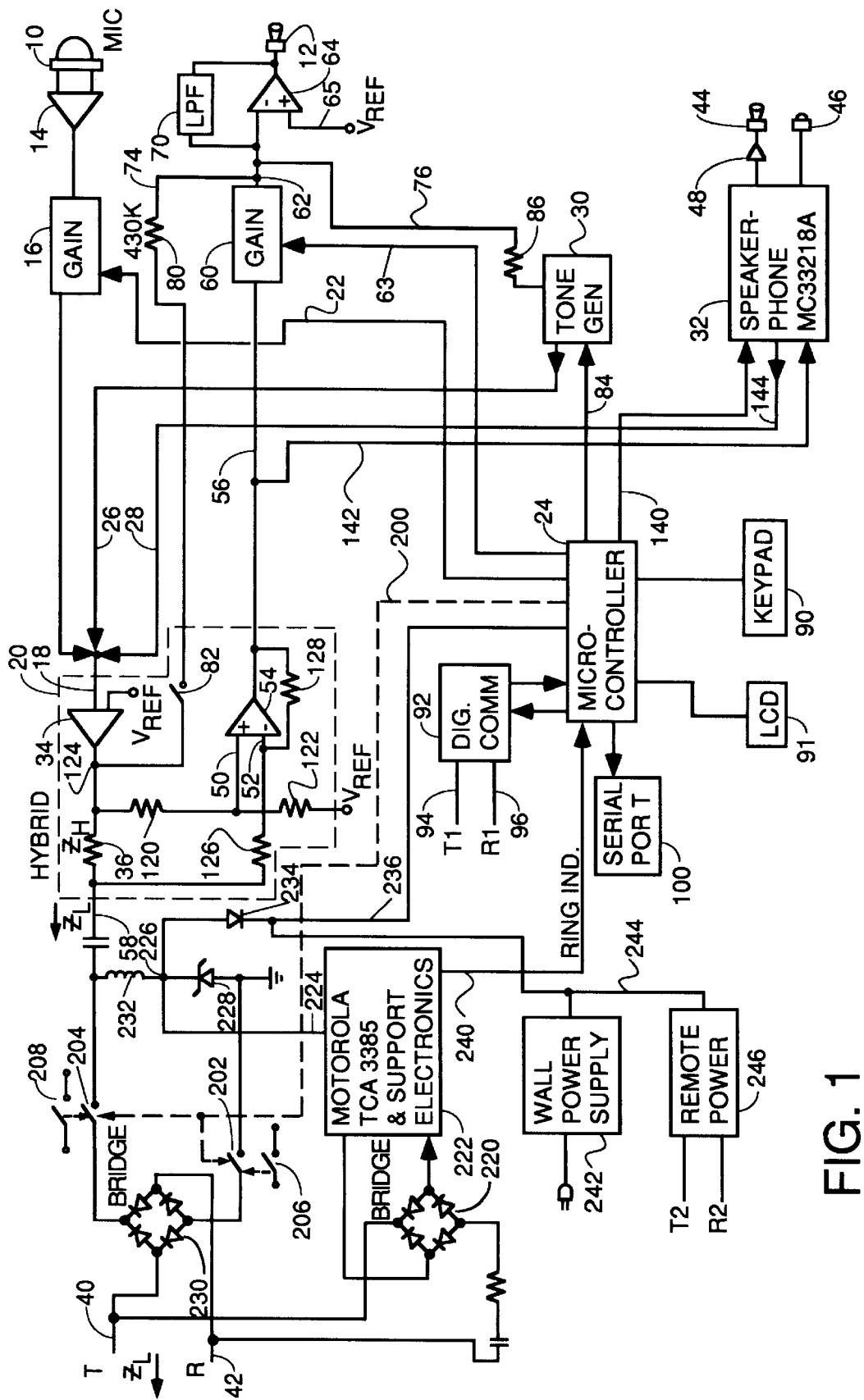
FIG. 1 is a block diagram of a telephone with a selectable sidetone level according to the genus of the invention.

Referring to FIG. 1, there is shown a block diagram of a telephone with a programmable sidetone according to the teachings of the invention. The handset of the phone has built therein a microphone 10 and a speaker 12 or other type of transducer to convert audio signals to audible sounds. The phone also has a built-in speakerphone comprised of microphone 46 driving a speakerphone circuit 32, said speakerphone circuit also driving a speaker 44 (or other type of transducer to convert audio signals to audible sounds) through a power amplifier 48. The microphone 10 is coupled to an amplifier 14 which drives the analog transmitted signal input 18 of a hybrid 20 through a programmable gain circuit 16. The programmable gain circuit 16 is controlled by a signal on line 22 from microcontroller 24. The program for microcontroller 24 is given in assembly language the assembly language being for an AT89C52 microprocessor manufactured by Atmel. The programmable gain circuit 16 is typically a digitally controlled multiplexer switch which switches a selectable one of a plurality of resistors into the gain control resistor network of an operational amplifier within the programmable gain control circuit 16 thereby controlling the gain of the operational amplifier.

The hybrid 20 also has analog audio inputs at 26 and 28 for signals from a DTMF tone generator 30 and a speakerphone circuit 32, respectively. The tone generator 30 and the speakerphone 32 are both commercially available integrated circuits, the speakerphone being a Motorola MC33218A and the tone generator being a Phillips PCD3311CP. All these audio signals are summed at input 18 and amplified by amplifier 34. The output of amplifer 34 drives an impedance 36 which is set to match the impedance $Z_L$ seen looking into the tip and ring lines when the tip and ring lines 40 and 42 are connected into the analog tip and ring lines of a PEU port of a phone system supplied by the assignee of the present invention. When this situation is true, the impedance match is so close that very little sidetone is generated at speaker 12 of the handset (or speaker 44 of the speakerphone if the speakerphone is being used). Sidetone is generated at a higher level however when the phone is plugged into the public telephone network or a telephone system supplied by another supplier where the value of $Z_L$ is not known. This happens because the impedance 36 does not match the impedance $Z_L$ which causes the signals received at noninverting and inverting inputs 50 and 52 of differential amplifier 54 to be unbalanced thereby generating a portion of the transmitted audio signal on line 58 as a sidetone signal at output 56. This sidetone signal is mixed with incoming audio signals from the other conversant arriving on the tip and ring lines 40 and 42 and is amplified in a programmable gain circuit 60.

The function of the programmable gain circuit circuit 60 is to allow control of the gain of the receive circuitry driving speaker 12. The programmable gain circuit 60 receives a signal from microcontroller 24 on line 63 which controls switching of a multiplexer inside the programmable gain circuit 60 to set the gain. The programmable gain circuit 60 is a multiplexer having one input coupled to line 56 and a plurality of outputs each of which is coupled to a different size resistor (not shown but included within circuit 60). The control signal on bus 63 controls which of these resistors is placed in series between line 56 and a summing junction 62 at the input of an amplifier 64.

The function of amplifier 64 is to provide a variable gain to the received signal which is sufficient to make the signal audible at speaker 12. Amplifier 64 is schematically shown as a differential amplifier, but it is actually a differential amplifier coupled to drive a push-pull transistor pair acting as a power amplifier. The differential amplifier has a non-inverting input coupled to a reference voltage via line 65. The inverting input is coupled to summing node 62. Low pass filter 70, comprised of a 100K resistor in parallel with a 0.00027 microfarad capacitor, provides a feedback path from the output of the pair of amplifiers 64 to the summing node 62 to convert the summing node into a virtual ground. The signal heard at speaker 12 is the sum of the audio signals on lines 74, 76 and the output of the programmable gain circuit 60. Line 76 comes from the DTMF tone generator 30 through resistor 86. This tone generator can be commanded by the microcontroller 24 via commands on bus 84 to generate DTMF dialing tones, ring tones and other call progress tones needed to signal to the user various phases of the call. Because line 76 is coupled to summing node 62, when DTMF or other tones are generated, they can be heard at a reduced volume through speaker 12. This is because when the microcontroller 24 turns the tone generator on, it turns off the programmable gain circuit 60 and opens switch 82 so no sidetone feedback reaches summing node 62. This causes the gain of amplifier 64 to be set by the ratio of the resistor in low pass filter 70 to resistor 86. Resistor 86 is selected to establish the desired gain level for these call progress tones.

Programmable sidetone level is achieved by bypassing the hybrid with feedback of part of the transmitted audio. Line 74 is the programmable sidetone bypass path which selectively feeds part of the transmitted audio signal from amplifier 34 back to the summing node 62 through a resistor 80 and a switch 82. In the preferred embodiment, the switch 82 is a transistor having an on state in which a low resistance path exists coupling the output 124 of amplifier 34 to resistor 80, and having an off state in which the path from line 124 to resistor 80 is a high resistance path. The on or off state of switch 82 is controlled by microcontroller 24. In alternative embodiments, the switch 82 can be a mechanical switch which is directly operable by the user and is not controlled by the microcontroller.

In the preferred embodiment, the microcontroller controls the phone such that if it has turned on the tone generator and commanded it to generate a tone, then it will simultaneously control the programmable gain circuit 60 to shut off the signal path from line 56 to the summing node 62. If the tone generator is turned on, the microcontroller will also control switch 82 in the programmable sidetone signal path to open it thereby cutting off the sidetone feed into the summing node 62. When the tone generator is on, the gain of amplifier 64 will be set by the ratio between the resistor in low pass filter 70 and resistor 86.

When the tone generator 30 is turned off, the microcontroller 24 will control the gain circuit 60 to set some desired gain level and may or may not turn on switch 82. Switch 82 controls the level of sidetone generated regardless of whether there is an impedance match or not between impedance 36 and $Z_L$. Further, when the phone is connected to a phone system supplied by the assignee, there will be an impedance match very little sidetone will be generated when switch 82 is open but more sidetone will be generated when switch 82 is closed. The microcontroller will control gain control circuit 60 to some level of gain when the tone generator 30 is not on and may or may not close switch 82, depending upon its configuration data which is programmed by the user (or which is sent to the microcontroller from a central process via the digital communication circuit 92). When the programmable gain control circuit 60 has a level of gain selected, the gain of amplifier 64 is controlled by the ratio of the resistor in low pass filter 70 to whatever resistor is selected by gain circuit 60. When the sidetone control switch 82 is closed, the gain of the amplifier 64 is controlled by the ratio of the resistor in low pass filter 70 to resistor 80, and the sidetone signal on line 74 is summed at node 62 with whatever incoming audio exists on line 56 plus any sidetone component it has (which depends upon the level of impedance match between the hybrid and the impedance $Z_L$ seen looking into the tip and ring lines). In one embodiment, the user can program the phone's microcontroller 24 using the keypad 90 and LCD display 92 to control various aspects of the phone's operation including whether to increase or decrease the level of sidetone. In other embodiments, switch 82 can be a manually operated switch on the side of the phone which can be operated directly by the user. Generally, if the phone is to be used in a noisy environment such as on a factory floor or in a restaurant with numerous customers, the level of sidetone should be set lower so as to not interfere with clearly hearing the other party to the conversation by addition of noise picked up in the noisy environment by the handset microphone.

In the preferred embodiment, the microcontroller 24 can receive digital commands from a control process running elsewhere in a phone system of which the phone is a part. That digital communication channel is symbolized by digital communication circuit 92 which is coupled to T1 and R1 lines 94 and 96. The microcontroller can also output digital data to other systems such as point of sale computers via a serial port 100. A novel application of these two digital communication paths is for the control process running elsewhere to receive caller ID information and decode it and send the caller ID information to the microcontroller 24 via digital communication circuit 92. The microcontroller 24 then packages this caller ID information into a packet or other data block useable by whatever system is coupled to serial port 100 and sends the caller ID information to the other system via the serial port.

The receive portion of hybrid 20 centers on differential amplifier 54. Resistors 120 and 122 sample part of the transmitted audio on line 124 and couple it via line 50 to the positive input of differential amplifier 54. Resistors 126 and 128 sample a portion of the line signal across $Z_L$ and couple it via line 52 to the inverting input of amplifier 54. The ratio of resistor 120 to resistor 122 versus the ratio of resistor 126 to resistor 128 are adjusted so as to give good cancellation so as to generate little sidetone when the phone is connected to a phone system where there is a good impedance match between $Z_L$ and the output impedance 36 of the hybrid. This level of sidetone can be increased by the user for quiet environments by closing switch 82. For noisy environments, switch 82 is left open.

Microcontroller 24 can enable speakerphone circuit 32 via line 140 for purposes of paging when the phone used is a phone system such as is supplied by the assignee. In an embodiment where such a phone system is in use, when a page is to be sent out to all phones in the system to find somebody, the microcontroller 24 enables the speakerphone via line 140 and sets the speakerphone volume. This happens when the microcontroller 24 receives digital information via the digital communication circuit 92 that a page is coming. Next, the microcontroller 24 electronically commands the phone to go offhook. This is done by sending a signal on a path represented by dashed line 200 to cause switches 202 and 204 to close thereby causing the phone to go offhook. Switches 202 and 204 are actually transistors which turn on when the microcontroller commands the offhook condition. Switches 202 and 204 can also be closed by the physical action of lifting the handset off the cradle. This causes physical hookswitches 206 and 208 to actuate in such a manner as to cause drive voltages to the transistors 202 and 204 so as to turn them on. The combination of the line 200 and switches 202, 204, 206 and 208 are referred to in the claims as an electronic hook control circuit.

To complete the page, the central process of the phone system (not shown) then sets up switching circuitry in a portion of the phone system central controller (not shown) such that the audio information of the page is routed to a PEU unit (not shown) to which all the phones are connected. From the PEU unit, the audio signals of the page are routed to the tip and ring lines of all the phones in the system. The audio signals of the page then enter each phone through tip and ring lines corresponding to lines 40 and 42 and pass through the hybrid 20 and appear on line 142. The audio signals on line 142 are coupled to the speakerphone circuit and are amplified by amplifier 48 and broadcast from speaker 44.

The phone of FIG. 1 can also be used as a room monitor. If the phone is to be used in this mode, the central control process sends a command via the digital communication circuit 92 commanding room monitor mode. This causes microcontroller 24 to enable the microphone path of the speakerphone circuit 32 and command the phone to go offhook via a command on line 200 closing switches 202 and 204. Any sounds in the room which are sufficiently loud will then be picked up and converted to audio signals which are transmitted to the central control process for monitoring via line 144, hybrid 20 and tip and ring lines 40 and 42. Neither paging or room monitoring will work when the phone is physically on hook and not ringing, unless the phone has a power supply external to the power supplied via the tip and ring lines. The phone is self-powered whenever it receives a power ring on the tip and ring lines. A power ring signal is a high voltage (120 VAC max) AC signal across the tip and ring lines. This signal is rectified to pulsating DC signals by bridge 220. These DC pulses are filtered and converted to steady state DC by circuit 222. This circuit is a Motorola TCA 3385 and the supporting electronics necessary to make it function properly. The DC voltage generated by circuit 222 is output on line 224 to node 226. Node 226 supplies power through diode 234 to line 236. Line 236 is the line from which power to other circuits in the phone is taken. A zener diode 228 regulates the voltage on node 226 to prevent it from ever rising above the Zener's breakdown voltage.

When a power ring signal is received, circuit 222 generates a ring indicator signal on line 240 which informs the microcontroller 24 that a power ring is being received. The microcontroller then sets the gain of programmable gain circuit 60 to zero, opens switch 82, enables tone generator 30 via a command on bus 84 and instructs it to generate a ring tone. The microcontroller 24 also activates the speakerphone circuit 32 via line 140 such that an audible ring is output by speaker 44.

In addition to being self-powered when a power ring signal is being received, the phone is also self-powered whenever it is offhook. When offhook, switches 204 and 202 are closed, and loop current in one of the tip and ring lines 40 or 42 and through bridge 230. Protection circuitry to protect the phone electronics from voltage spikes on the tip and ring lines is not shown. Bridge 230 forces this loop current to always have a known polarity. An artificial inductor 232 comprised of two transistors coupled to have a high impedance to AC but a low impedance to DC serves to couple the DC loop current to node 226. The zener diode 228 regulates the voltage at node 226 to the voltage needed by the circuitry of the phone. DC power is supplied from line 236 to the microcontroller 24 via diode 234. Power connections to other circuits such as the speakerphone and amplifiers are not shown.

From the foregoing it is apparent that, unless an external power supply is used, the phone is completely unpowered if it is on hook and not receiving a power ring signal. Thus, to use the phone for paging or room monitoring, an external power supply must be used. Wall power supply rectifier circuit 242 can be used for this purpose and supplies rectified DC to node 236 via diode 234. Likewise, if the phone is connected to a phone system including a PEU such as is supplied by the assignee of the present invention, external power can be supplied via T2 and R2 lines from the PEU. Circuit 246 can be used to condition the power received on T2 and R2 and to isolate the phone electronics from any surges on these lines.

When speaker phone circuit 32 is to be used for a conversation, sounds picked up by the microphone 46 are amplified in the speakerphone circuit and output on line 144 where they are input to the hybrid 20 at summing junction 18. They are amplified by transmit amplifier 34 and coupled to the tip and ring lines 40 and 42. Sounds from the other conversant arrive on the tip and ring lines and pass through the hybrid 20 and are output by receive amplifier 54 at audio output port/line 56. This port is coupled to the audio signal input of the speakerphone 32 and is coupled through the speakerphone duplexing and feedback suppression circuitry to amplifier 48 and speaker 44.

The digital communication circuit can be any circuit suitable to receive digital information in whatever form or packet organization it is sent and format it for transfer to whatever microcontroller is in use. Since there are so many different possibilities for these two issues, and since the digital communication circuit can be easily designed by those skilled in the art once the protocol is known and the microcontroller is known, no further details about the digital communication circuit are given here.

In an alternative embodiment, resistors 120 and 122 can be programmable so that their ratio is programmable by the user. The ratio of the resistance of these two resistors controls the amount of sidetone that will be present in the path through the receive amplfier 54, and making this ratio programmable provides the capability for the phone to have an adjustable level of sidetone even if an imperfect impedance match exists such as where the phone is connected to a phone line connected directly to the central office. The resistors can be made programmable in any known way such as by mechanical selector switches operable by the user which are connected to arrays of resistors or through the use of circuits like the programmable gain circuits 16 and 60 which are under control of the microprocessor. In some embodiments, the microprocessor 24 will control the value of resistors 120 and 122 on the basis of configuration data which can be altered at will by the user.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A circuit with selectable sidetone levels in a telephone, comprising:

tip and ring lines for receiving and transmitting audio signals, said tip and ring lines having a characteristic impedance;

a three port hybrid circuit having a first port coupled to said tip and ring lines and having an audio input port for receiving audio signals to be transmitted, and having an audio output port, and including a transmit amplifier to amplify signals received at said audio input port and having a hybrid impedance coupled between said first port and the output of said transmit amplifier, and having a receive amplifier coupled to amplify a difference voltage generated from the difference between the voltage at said output of said transmit amplifier and the voltage at said said first port and present the amplified signal at said audio output port;

an audio transducer such as a speaker for converting audio signals to audible sounds;

a differential amplifier having inverting and noninverting inputs, one of said inputs coupled to a reference voltage and the other of said inputs coupled to said audio output port of said hybrid and acting as a summing node, and having an output coupled to drive said audio transducer;

a low pass filter coupled to provide feedback of part of the ouput signal generated by said differential amplifier back to said summing node; and a programmable sidetone only feedback conductive path comprised of a manually operable switch accessible to the user of said telephone and a resistor, said switch having an input coupled to said output of said transmit amplifier and having an output coupled to one of two terminals of said resistor, the other terminal of said resistor coupled to said summing node of said differential amplifier driving said audio transducer.

2. A circuit with selectable sidetone levels in a telephone, comprising:

tip and ring lines for receiving and transmitting audio signals, said tip and ring lines having a characteristic impedance;

a three port hybrid circuit having a first port coupled to said tip and ring lines and having an audio input port for receiving audio signals to be transmitted, and having an audio output port, and including a transmit amplifier to amplify signals received at said audio input port and having a hybrid impedance coupled between said first port and the output of said transmit amplifier, and having a receive amplifier coupled to amplify a difference voltage generated from the difference between the voltage at said output of said transmit amplifier and the voltage at said said first port and present the amplified signal at said audio output port;

an audio transducer such as a speaker for converting audio signals to audible sounds;

a differential amplifier having inverting and noninverting inputs, one of said inputs coupled to a reference voltage and the other of said inputs coupled to said audio output port of said hybrid and acting as a summing node, and having an output coupled to drive said audio transducer;

a low pass filter coupled to provide feedback of part of the ouput signal generated by said differential amplifier back to said summing node; and a programmable sidetone only feedback conductive path comprised of a switch and a resistor, said switch having an input coupled to said output of said transmit amplifier and having an output coupled to one of two terminals of said resistor, the other terminal of said resistor coupled to said summing node of said differential amplifier driving said audio transducer;

and wherein said switch is a transistor having an on state wherein a low resistance path is provided through said transistor from said output of said transmit amplifier to said resistor and an off state wherein said path from said output of said transmit amplifier to said resistor has high resistance, and further comprising a microcontroller programmed to control said transistor to be in either said on state or said off state depending the state of configuration data.

3. The apparatus of claim 1 wherein said switch is a mechanical switch.

4. The apparatus of claim 2 further comprising a programmable gain control means for coupling the audio signal at said audio output port of said hybrid to said summing node through a s elected one of a plurality of resistors, the particular one of said resistors being selected to couple said audio signal being under control of said microcontroller.

5. The apparatus of claim 1 further comprising a speakerphone means coupled to said audio output and audio input ports of said hybrid for transmitting and receiving audio signals.

6. The apparatus of claim 2 further comprising a speakerphone means coupled to said audio output and audio in put ports of said hybrid and coupled to said microcontroller for transmitting and receiving audio signals of a telephone conversation and for converting audio signals of pages into audible sound.

7. The apparatus of claim 2 further comprising means for self-powering the apparatus from loop current when said telephone is offhook, and for self-powering said apparatus from a power ring signal received on said tip and ring lines when said telephone has an incoming call.

8. The apparatus of claim 2 further comprising a speakerphone circuit having an audio signal output coupled to said audio input port of said hybrid circuit and having an audio signal input coupled to said audio output port, and having an audio output coupled to a speaker through a power amplifier, and having an audio input coupled to a microphone, said speakerphone circuit having an input coup led to receive a signal from said microcontroller that sets the gain of said speakerphone circuit.

9. The apparatus of claim 2 further comprising an electronic hook control circuit coupled to said tip and ring lines and to said microcontroller for causing an off hook condition thereby coupling said tip and ring lines to said first port of said hybrid when either a handset of said telephone is lifted off the cradle or when a command is received from said microcontroller commanding said off hook condition.

10. The apparatus of claim 2 further comprising a digital communication circuit coupled to receive digital data from a digital data bus comprised of T1 and R1 lines and having an output coupled to said microcontroller and further comprising an electronic hook control circuit coupled to said tip and ring lines and coupled to said microcontroller such that said microcontroller can control the state of said electronic hook control circuit to cause an off hook or on hook condition on said tip and ring lines, and further comprising a speakerphone circuit coupled to said tip and ring lines through said three port hybrid circuit and coupled to said microcontroller such that said microcontroller can enable and disable said speakerphone circuit and control its gain, and wherein said microcontroller is programmed to receive information via said digital communication circuit that a page in the form of an audio signal is arriving on said tip and ring lines and react thereto by sending a command to said electronic hook control circuit commanding an off hook condition and sending a command to said speakerphone circuit setting its gain at a level acceptable for converting said audio signal of said page to audible signals.

11. The apparatus of claim 10 wherein said microcontroller is programmed to receive a command to perform room monitoring via said digital communication circuit and react thereto by sending a command to said electronic hook control circuit commanding an off hook condition, and then sending a command to said speakerphone circuit enabling and setting the gain of a receive path therein coupled to a microphone and functioning to amplify audio signals received from said microphone and transmit them to said audio input port of said hybrid circuit for transmission on said tip and ring lines.

12. A process for controlling sidetone levels in a telephone, comprising the steps of:

converting sounds into audio signals and coupling them through a transmit amplifier of a hybrid circuit to tip and ring lines of a telephone line for transmission to another conversant in a telephone conversation, wherein said hybrid has a close impedance match with the characteristic impedance of said tip and ring lines so as to generate little or no sidetone;

receiving audio signals from said tip and ring lines and coupling them through said hybrid circuit to a summing node virtual ground at the input of a differential amplifier having a low pass filter feedback path, which in conjunction with resistors coupled to said summing node, set the gain of said differential amplifier, said differential amplifier driving an audio transducer for conversion of said audio signals to audible sound; and feeding back part of the audio signal at the output of said transmit amplifier to said summing node through a sidetone only feedback path comprised of a switch and resistor and closing said switch when a higher level of sidetone is desired and opening said switch to cut off said feedback path when a lower level of sidetone is desired.

* * * * *